US012812467B2

(12) United States Patent
Fleck

(10) Patent No.: US 12,812,467 B2

(45) Date of Patent: Nov. 24, 2026

(54) RATE-BASED PACKET WINDOWING TECHNIQUE WITH IMPLICIT SYNCHRONIZATION

(71) Applicant: Aclara Technologies LLC, St. Louis, MO (US)

(72) Inventor: Christopher Keith Fleck, St. Louis, MO (US)

(73) Assignee: Aclara Technologies LLC, St. Louis, MO (US)

( * ) Notice: Subject to any disclaimer, the term of this patent is extended or adjusted under 35 U.S.C. 154(b) by 88 days.

(21) Appl. No.: 18/893,161

(22) Filed: Sep. 23, 2024

(65) Prior Publication Data

US 2025/0106685 A1 Mar. 27, 2025

Related U.S. Application Data

(60) Provisional application No. 63/585,095, filed on Sep. 25, 2023.

(51) Int. Cl.

| | |
|---|---|
| ***H04L 47/27*** | (2022.01) |
| ***G06F 15/16*** | (2006.01) |
| ***H04L 5/00*** | (2006.01) |
| ***H04L 12/26*** | (2006.01) |
| ***H04L 12/56*** | (2006.01) |
| ***H04L 12/803*** | (2013.01) |
| ***H04L 15/16*** | (2006.01) |
| ***H04L 47/34*** | (2022.01) |
| ***H04W 28/02*** | (2009.01) |
| ***H04W 28/06*** | (2009.01) |

(52) U.S. Cl.

CPC ........... *H04W 28/065* (2013.01); *H04L 47/27* (2013.01); *H04L 47/34* (2013.01); *H04W 28/0268* (2013.01)

(58) Field of Classification Search

CPC ....................... H04W 28/065; H04W 28/0268; H04L 47/27; H04L 47/34

USPC .......................................................... 709/238

See application file for complete search history.

(56) References Cited

U.S. PATENT DOCUMENTS

| | | | | |
|---|---|---|---|---|
| 6,505,253 | B1 | 1/2003 | Chiu et al. | |
| 8,699,361 | B2 * | 4/2014 | Jim | H04L 47/34 455/452.2 |
| 2002/0181494 | A1 | 12/2002 | Rhee | |
| 2005/0135525 | A1 | 6/2005 | Singh et al. | |
| 2007/0242683 | A1 * | 10/2007 | Pelletier | H04W 28/06 370/401 |

(Continued)

OTHER PUBLICATIONS

PCT/US2024/047987 International Search Report and Written Opinion dated Dec. 12, 2024.

*Primary Examiner* — Berhanu Shitayewoldetsadik

(74) *Attorney, Agent, or Firm* — Michael Best & Friedrich LLP

(57) ABSTRACT

Systems and methods for operating a wireless network using rate-based packet windowing with implicit synchronization. One example method includes assigning a packet sequence number to each of a first plurality of data packets based on a time synchronization for a data link layer for a network context. The method further includes transmitting, via a transceiver, the first plurality of data packets for the network context during a rate-based packet window at or below a maximum packet transmission rate based on a time period and the rate-based packet window.

30 Claims, 7 Drawing Sheets

(56) References Cited

U.S. PATENT DOCUMENTS

| | | | | |
|---|---|---|---|---|
| 2009/0080463 | A1* | 3/2009 | Yang | H04L 47/193 370/476 |
| 2015/0156130 | A1* | 6/2015 | Varsanyi | H04L 47/323 370/412 |
| 2017/0118120 | A1* | 4/2017 | Testicioglu | H04L 47/193 |
| 2020/0100254 | A1* | 3/2020 | Dong | H04L 5/001 |
| 2022/0174539 | A1* | 6/2022 | Dao | H04W 28/0268 |
| 2023/0123387 | A1 | 4/2023 | Southworth et al. | |

* cited by examiner

RATE-BASED PACKET WINDOWING TECHNIQUE WITH IMPLICIT SYNCHRONIZATION

CROSS-REFERENCE TO RELATED APPLICATIONS

The present application is related to and claims benefit under 35 U.S.C. § 119 (e) from U.S. Provisional Patent Application Ser. No. 63/585,095, filed Sep. 25, 2023, entitled "Rate-Based Packet Windowing Technique with Implicit Synchronization," the entire contents of which is incorporated herein by reference.

BACKGROUND OF THE INVENTION

Utilities, for example, electric utilities, use wireless data communication networks to connect smart devices for monitoring and controlling their infrastructure. For example, electric usage meters, sensors, and other devices may provide telemetry data to automated billing and monitoring systems for an electric utility. Increasingly, such communications are two-way, for example, when used for controlling smart electric grids using distributed automation. Such wireless communication networks may include hundreds of base stations communicating with thousands of end nodes using limited radiofrequency spectrum.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
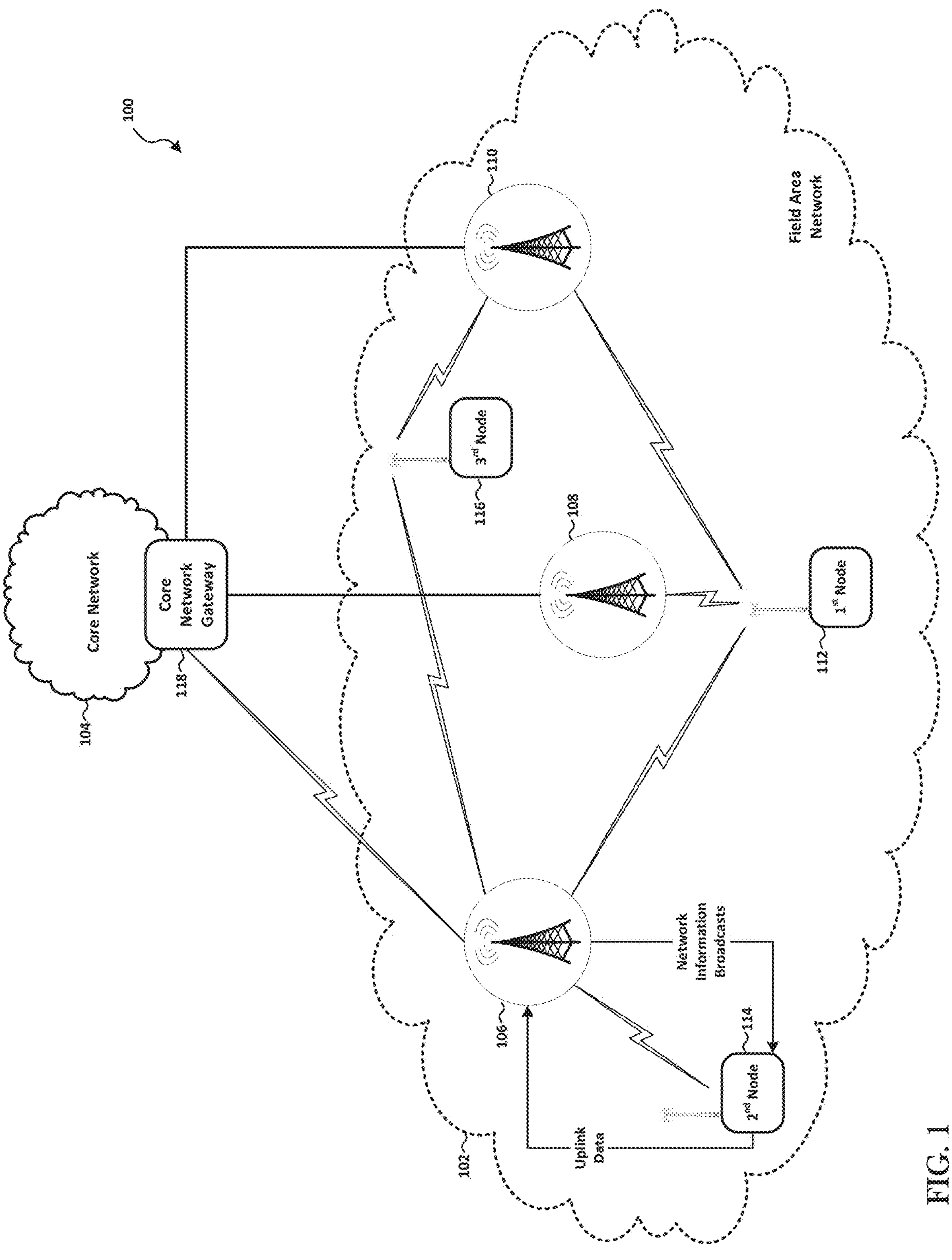
FIG. 1 illustrates a communications system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments illustrated.

In some instances, the apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In wireless communication systems, providing high quality of service (QOS) packet delivery services can be achieved by various techniques. However, these techniques include sacrificing some portion of channel bandwidth, which might otherwise be used to transmit data payloads, for control signaling overhead to manage the QoS. One such technique is feedback-based sliding windows for managing packet delivery, such as, for example, Automatic Repeat Request (ARQ). In ARQ, both the transmitter and receiver track the state of a shared unidirectional connection and through the use of positive and negative acknowledgements can provide packet delivery service qualities used to implement QoS. Packet delivery service qualities include flow control, acknowledged delivery (AD), ordered data delivery (OD) and duplicate detection and rejection (DDR). ARQ uses control plane signaling to create and initially synchronize a connection (sometimes referred to as a session) between a transmitter and a receiver. The control plan signaling is also required to maintain synchronization between the transmitter's and receiver's sliding windows while the connection is in operation.

In narrowband wireless communication systems, channel bandwidth is a scarce resource. The impact of a robust control plane required for ARQ on such systems can be quite detrimental. However, the packet delivery qualities (flow control, acknowledged delivery, ordered data delivery, and duplicate detection and rejection) provided by a feedback-based sliding window approach are still desirable in narrowband networks.

An alternative approach is to use rate-based sliding windowing, knowing that acknowledged delivery cannot be provided without feedback but is a reasonable tradeoff to achieve more efficient ordered data delivery, flow control, and duplicate detection and rejection. The rate-based sliding window approach is based on a synchronization of a clock rate between a transmitter and receiver. For example, the Transport Control Protocol (TCP) uses a form of rate-based windowing to detect delayed duplicate packets in its three-way connection handshake. This approach utilizes synchronized clock rates (but not absolute time stamps) to keep track of the passage of time and, therefore, the expiration of any potential outstanding packet. Further improvements of TCP added Protection Against Wrapped Sequence Numbers (PAWS) in RFC 1323 (obsoleted by RFC 7323) where an absolute timestamp is provided in the TCP headers to further protect against delayed duplicate packets on very high-speed networks. While the sequence numbers in TCP provide ordered data delivery, the rate-based windowing provides delayed duplicate rejection, and other control signals provide flow control. However, TCP is a connection-based protocol, which still requires signaling overhead to synchronize the rate based sliding window.

To address these problems and for other reasons, systems and methods are provided herein for providing packet level flow control, ordered data delivery, and duplicate detection and rejection in a wireless communications system using rate-based packet windowing and underlying network time synchronization. Among other things, embodiments and examples described herein provide rate-based sliding windowing, which does not require any signaling overhead or connection frames/packets to establish the packet delivery service qualities of flow control, ordered data delivery, and duplicate detection and rejection. Rather than relying on signaling or added timing mechanisms, the solutions presented herein leverage an underlying network link where the timing is tied to an absolute time reference. For example, some TDMA networks provide accurate time synchronization as part of the modulation technique. Therefore, any transmitter that is synchronized sufficiently to transmit on the network is also time synchronized sufficiently to allow the use of the timing in implementing packet delivery service qualities for the network. Examples are described herein with respect to a TDMA network. However, the systems and methods set forth herein are applicable to any network that operates using an absolute timing reference.

Such embodiments provide increased quality of service for wireless communications networks, without requiring additional explicit signaling to achieve packet window synchronization. Using such embodiments, quality of service is increased while overhead is limited, resulting in increased network throughput. This, in turn, leads to a more spectrally efficient and effective use of the network and its computing resources.

One example embodiment provides a wireless communication device. The wireless communication device includes an electronic processor and a transceiver coupled to the electronic processor. The electronic processor is configured to assign each of a first plurality of data packets a packet sequence number based on a time synchronization for a data link layer for a network context. The electronic processor is configured to transmit, via the transceiver, the first plurality of data packets for the network context during a rate-based packet window at or below a maximum packet transmission rate based on a time period and the rate-based packet window.

Another example embodiment provides a method for operating a wireless communication device. The method includes assigning a packet sequence number to each of a first plurality of data packets based on a time synchronization for a data link layer for a network context. The method further includes transmitting, via a transceiver, the first plurality of data packets for the network context during a rate-based packet window at or below a maximum packet transmission rate based on a time period and the rate-based packet window.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

It should be understood that although certain figures presented herein illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

FIG. 1 is a diagram of one example embodiment of a wireless communication system 100. In the example illustrated, the system 100 includes a field area network 102 and a core network 104. In the illustrated example, the field area network 102 is a radio area network comprised of wireless communication devices, including a first base station 106, a second base station 108, a third base station 110, a first end node 112, a second end node 114, and a third end node 116. In one example, the field area network 102 is low power short packet wireless communication network deployed to monitor and control equipment on an electric utility grid and the core network 104 is a back end computing network for the electric utility (including, for example, billing systems, grid monitoring systems, and other command and control for the electric grid). The first end node 112, the second end node 114, and the third end node 116 each include appropriate hardware and software components (e.g., electronic processors, memories, transceivers) for operating the end nodes as described herein. It should be noted that end nodes may be logical or physical in nature. For example, as illustrated in FIG. 1, each of the first end node 112, the second end node 114, and the third end node 116 may be implemented as a separate hardware device. However, in some aspects, a single hardware device may implement multiple logical end nodes (e.g., in software).

In the example illustrated, the field area network 102 is communicatively coupled to the core network 104 by a core network gateway 118. For example, each of the first base station 106, the second base station 108, and the third base station 110 are coupled to the core network gateway 118 via a suitable wired or wireless backhaul connection. The core network gateway 118 includes hardware and software components (e.g., electronic processors, memories, transceivers) for controlling electronic communications between the field area network 102 and the core network 104. In some embodiments, the core network 104 may be a cloud computing platform accessible via one or more networks, including over the Internet using encrypted tunnels or another secure virtual network connection.

Figure 2:
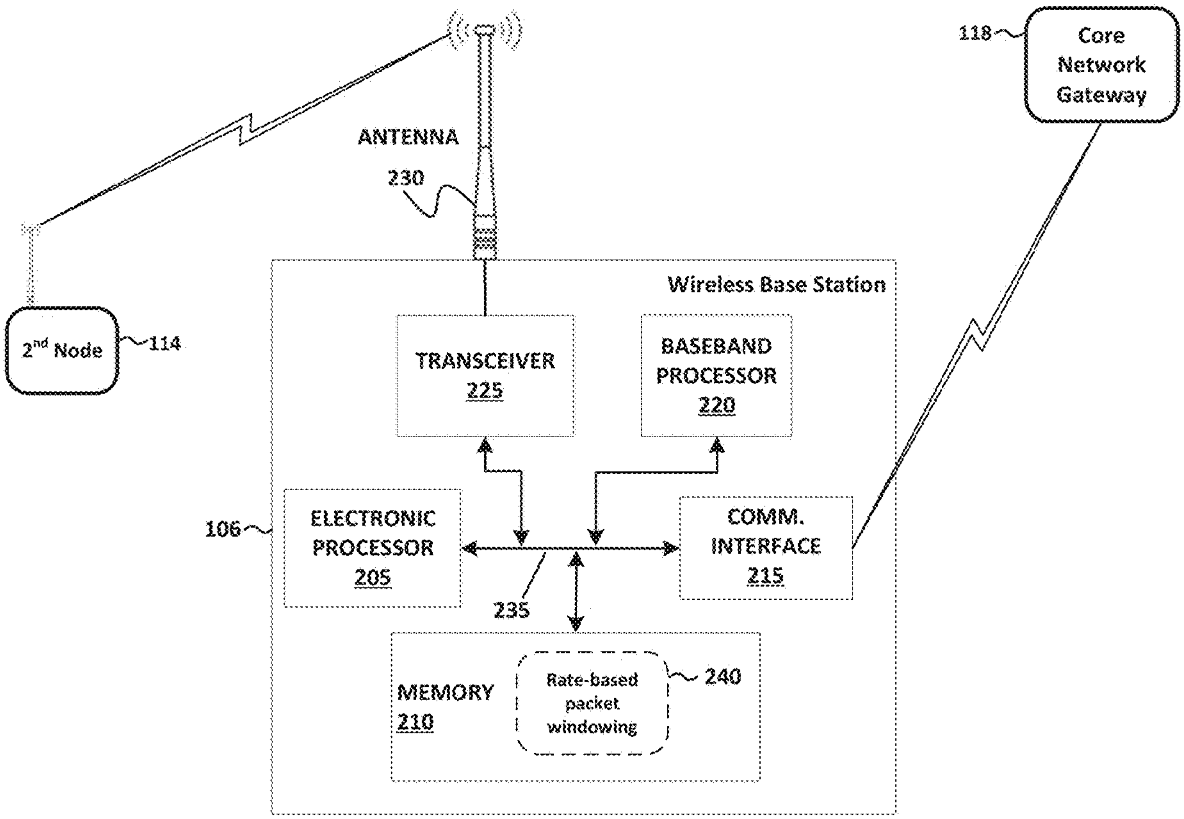
FIG. 2 is a diagram of a wireless base station of the system of FIG. 1 in accordance with some embodiments.

The first base station 106, the second base station 108, and the third base station 110, described more particularly with respect to FIG. 2, are wireless base stations for operating the field area network 102 to provide wireless communications to, from, and between the first end node 112, the second end node 114, and the third end node 116. In some instances, a base station of the field area network 102 may be referred to herein or in the accompanying figures as a "field network gateway" or an "FNG."

The system 100 may include more components than those illustrated. In particular, it should be understood that, although FIG. 1 illustrates only three base stations and three end nodes, the system 100 may include a field area network with tens, hundreds, or even thousands of base stations servicing tens, hundreds, or even thousands of end nodes.

In one example, the field area network 102 is a wireless network operating in the 450-470 MHz band using 12.5 kHz channels to provide narrowband packet-based data communications between 5 and 10 kbps. In one example, each of the base stations in the field area network 102 is configured to transmit data to the end nodes on a single downlink channel and receive data from the end nodes on one of many uplink channels, where the uplink and downlink frequencies are the same for each base station. Likewise, each of the end nodes is configured to receive data using the same downlink channel and transmit data on the same uplink channels. In some instances, the field area network 102 operates in geographic proximity to other users using the same or adjacent frequencies allocated from the same band as the field area network downlink and uplink channels.

In the example illustrated, the field area network 102 implements a data link layer communication that is Time Division Multiple Access (TDMA) based with a timing structure overlayed on each physical carrier (i.e., frequency). This timing structure, termed dayframe, divides a single day for a given carrier into a hierarchical breakdown of superframes and further into subslots. The relevant aspect of this dayframe construction is that a given dayframe is tied to an absolute time reference. For example, the reference may be a UTC (Coordinated Universal Time) date and time. In order to communicate on a given carrier, a transmitter (e.g., the first base station 106, the second base station 108, the third base station 110, the first end node 112, the second end node 114, and the third end node 116) must be synchronized to within some fraction of a subslot within the dayframe. Any transmitter that is synchronized sufficiently to transmit on a given physical carrier (i.e., frequency) is already time synchronized to within the same fraction of a subslot to absolute UTC time. Using this foundation, the devices on the field area network 102 are able to implement quality of service standards as described herein. Although the example illustrated and described herein features TDMA, it should be understood that the techniques described herein are applicable to a network operation with any protocol that provides timing in a similar way.

As illustrated in FIG. 1, an end node may be able transmit signals that can be received by multiple base stations and, likewise, be able to receive signals transmitted from multiple base stations. For example, the first end node 112 is able to communicate with all three base stations, whereas the second end node 114 is only able to communicate with the first base station 106, and the third end node 116 is able to communicate with the first base station 106 and the third base station 110, but not the second base station 108. In some instances, an end node may be able to receive transmissions from a particular base station but may be unable to send transmissions receivable by that base station. In some instances, an end node may be able to send transmissions receivable by a particular base station but be unable to receive transmissions from that base station.

As an example, FIG. 1 is illustrated with the second end node 114 in communication with the first base station 106. As illustrated in FIG. 1, and described herein, the first base station 106 sends network information broadcasts to the end nodes (including the second end node 114), and the second end node 114 sends uplink data to the first base station 106.

FIG. 2 schematically illustrates one example embodiment of a wireless communication device of the field area network 102. The example illustrated is the first base station 106. In the embodiment illustrated, the base station 106 includes an electronic processor 205, a memory 210, a communication interface 215, a baseband processor 220, a transceiver 225, and an antenna 230. The illustrated components, along with other various modules and components are coupled to each other by or through one or more control or data buses (for example, the bus 235) that enable communication therebetween. The description of base station 106 is provided as a representative example of other wireless communication devices of the field area network 102, including base stations 108 and 110. In some aspects, one or more of the end nodes and the core network gateway 118, although they may not have identical functions and capabilities, include systems or devices having a similar general component configuration as the base station 106, in that they each include a respective electronic processor, memory, communication interface, input/output interface, and/or radiofrequency communication components coupled by at least one communication bus.

The electronic processor 205 may include one or more microprocessors, an application-specific integrated circuit (ASIC), or another suitable electronic device. The electronic processor 205 obtains and provides information (e.g., to and from the memory 210 and/or the communication interface 215) and processes the information by executing one or more software instructions or modules, capable of being stored, for example, in a random access memory ("RAM") area of the memory 210, a read only memory ("ROM") of the memory 210, or another non-transitory computer readable medium (not shown). The software can include firmware, one or more applications, program data, filters, rules, one or more program modules, and other executable instructions. In the embodiment illustrated, the memory 210 stores, among other things, rate-based packet windowing routines 240 (described in detail herein).

The electronic processor 205 is configured to retrieve from the memory 210 and execute, among other things, software related to the control processes and methods described herein. The electronic processor 205 executes instructions stored in the memory 210 to implement functionality of the first base station 106.

The electronic processor 205 is configured to control the baseband processor 220 and the transceiver 225 to transmit and receive radiofrequency signals to and from the second end node 114 (and/or other end nodes) using the antenna 230. As described herein, the base station 106 is configured to operate using TDMA-based data link layer communication. It should be noted that many base stations and other communication devices typically employ multiple antennas in practice, to realize spatial diversity (e.g., MIMO). The electronic processor 205, the baseband processor 220, and the transceiver 225 may include various digital and analog components (for example, digital signal processors, high band filters, low band filters, and the like), which for brevity are not described herein and which may be implemented in hardware, software, or a combination of both. In some embodiments, the transceiver 225 is a combined transmitter-receiver component. In other embodiments the transceiver 225 includes or may be replaced by separate transmitter and receiver components.

The electronic processor 205 is configured to control the communication interface 215 (and, in some embodiments, the antenna 230, another antenna (not shown), or a suitable wired connection) to transmit and receive communication signals to and from the core network gateway 118.

Figure 3:
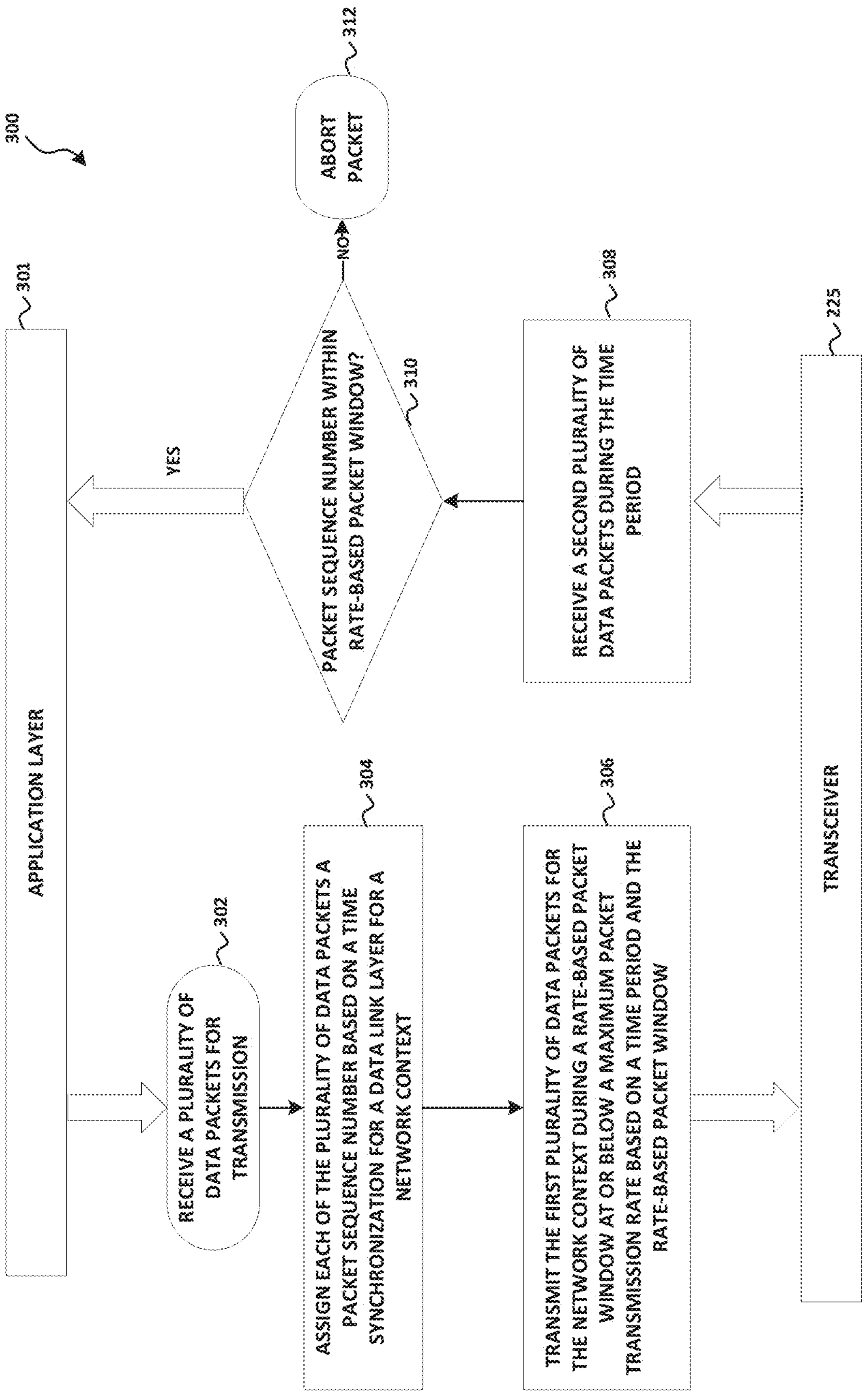
FIG. 3 is a flowchart illustrating a method for providing packet level flow control, ordered data delivery, and duplicate detection and rejection in a wireless communications system using rate-based packet windowing and underlying network time synchronization in accordance with some embodiments.

As noted, there is a need for improving quality of service in wireless networks without introducing additional overhead. Accordingly, FIG. 3 illustrates an example method 300 for, among other things, providing packet level flow control, ordered data delivery, and duplicate detection and rejection in a wireless communications system using rate-based packet windowing and underlying network time synchronization. Although the method 300 is described in conjunction with the system 100 as described herein, the method 300 may be used with other systems and devices. In addition, the method 300 may be modified or performed differently than the specific example provided.

By way of example, the method 300 is described as being performed by the first base station 106 and, in particular, the electronic processor 205. However, it should be understood that portions of the method 300 are be performed by other devices, including for example, one or more of the end nodes working in concert with one or more base stations. Additional electronic processors may also be included in the first base station 106 or other control equipment for the field area network 102 (not shown) that perform all or a portion of the method 300. For ease of description, the method 300 is described partially in terms of a single base station and a single end node. However, the method 300 may be applied to systems including multiple base stations and end nodes. The method 300 is also applicable to any pair of devices exchanging packets using an absolute time reference, as described herein.

The method 300 begins, at block 302, with the electronic processor 205 receiving from an application (e.g., operating in an application layer 301) a first plurality of data packets for transmission via a network context. As used herein, the term "network context" is a construct for grouping related packets. For example, a network context may be all packets communicated between a pair of network communication devices. In another example, a network context may be a physical carrier (e.g., a frequency of a wireless network). In another example, a network context is a bearer channel (i.e., a particular traffic flow). In aspects, a physical carrier may include multiple bearer channels.

Using the method 300, the electronic processor 205, at block 304, assigns each of the first plurality of data packets a packet sequence number based on a time synchronization for a data link layer for the network context. For example, the network context may be a physical carrier, in which case the time synchronization is an absolute time reference used by the modulation scheme (e.g., TDMA) for the physical carrier. In another example, the network context is a bearer channel, in which case the time synchronization is the absolute time reference used by the carrier over which the bearer channel is transmitted. The packet sequence numbers are determined as part of the rate-based windowing technique illustrated in FIG. 4A.

Figure 4A:
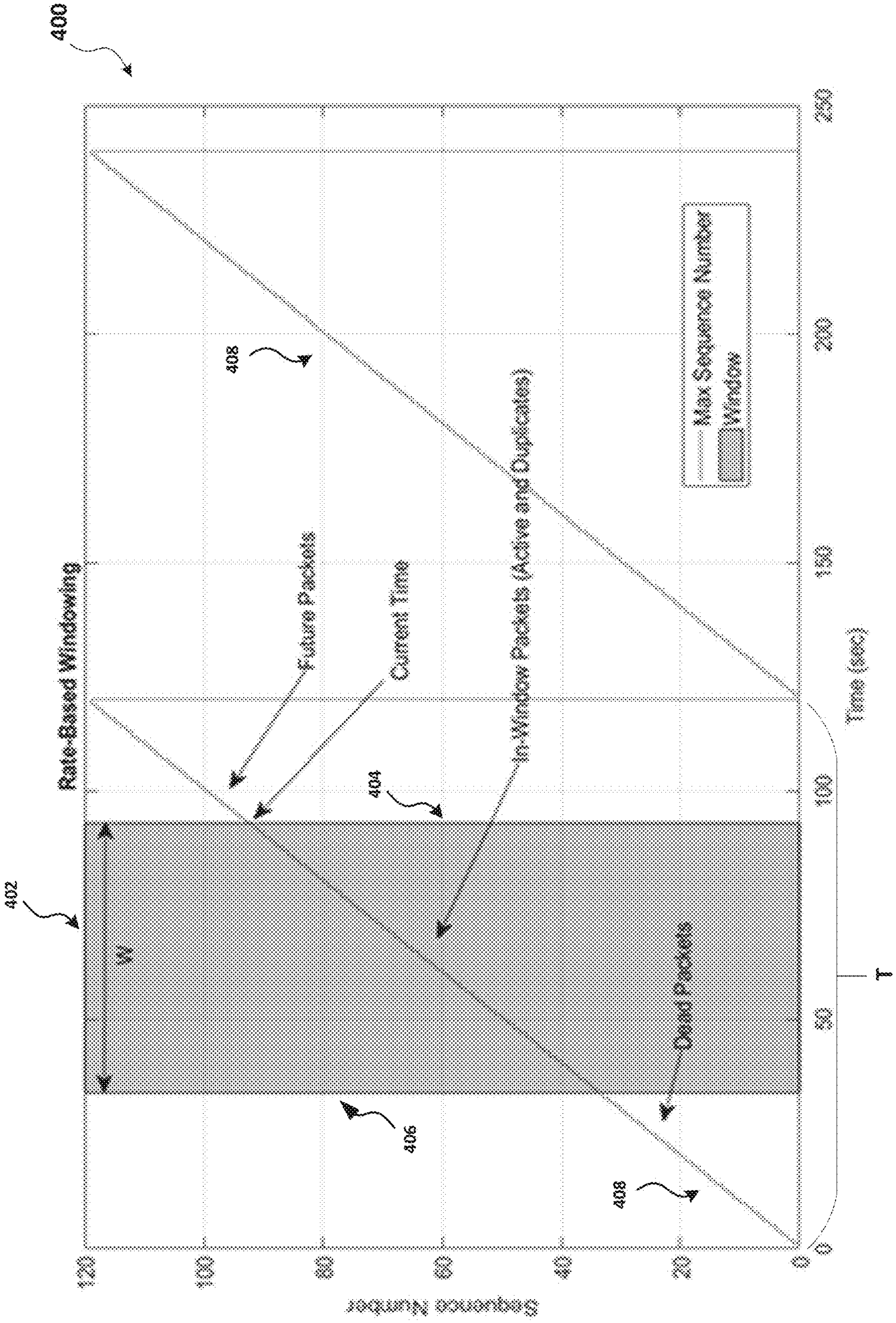
FIG. 4A is a chart illustrating aspects of the operation of the system of FIG. 1 in accordance with some embodiments.

FIG. 4A is a chart 400 illustrating aspects of the operation of the method 300. The chart 400 includes a rate-based packet window 402. The rate-based packet window 402 exists in the time domain. The rate-based packet window 402 has a leading edge 404 and a trailing edge 406, defining a window size W. The rate-based packet windowing technique, implemented by the method 300, is defined by three parameters: the window size (W), a time period (T), and a maximum packet transmission rate (R). The window size is the maximum time that a packet can be alive (i.e., usable by a receiving device). The time period is the time during which no packet sequence number can be repeated. The size of the time period T is some amount of time larger than the window size W. In the example illustrated in FIG. 4A, T=2*W. The maximum packet transmission rate is the maximum allowable rate at which a device can transmit packets. As described herein, rate-based packet windows may be assigned per network context. As such, the window size (W), a time period (T), and a maximum packet transmission rate (R) may be different for different network contexts, providing the ability to tune the experienced QoS for each network context.

Together, the maximum packet transmission rate R and time period T of uniqueness define the maximum number of packets as R*T=2*R*W. A binary representation of the resulting packet sequence number is then bounded by k (bits)=ceiling ($\log_2$(R*T)). In the example illustrated in FIG. 4A, W is set to 60 seconds and R is set to 1 packet per second. Assuming that T=2*W, the maximum packet sequence number is 120 and k=7 bits.

The rate-based packet window is shifted forward as time progresses based on the maximum packet transmission rate. For example, as illustrated in FIG. 4A, R is 1 packet per second, so the rate-based packet window shifts forward once each second. In some examples, the leading edge 404 is the current UTC time and the trailing edge 406 is the current UTC time minus the window size W.

When a packet is ready for transmission, the packet sequence number for the packet is derived from the leading edge of the rate-based packet window. In some embodiments, packet sequence numbers begin with zero at a given UTC time (e.g., the start of the dayframe) and roll over periodically according to T. The stair-cased sawtooth waveform 408 represents the list of packet sequence numbers as they increment over time.

Returning to FIG. 3, at block 306, the electronic processor 205 transmits, via the transceiver 225, the first plurality of data packets for the network context during a rate-based packet window at or below a maximum packet transmission rate based on a time period and the rate-based packet window. For example, the electronic processor 205 transmits the first plurality of data packets during the current rate-based packet window of size W at or below the maximum packet transmission rate R (see FIG. 4A). In some aspects, the electronic processor 205 may determine the rate-based packet window based on a desired quality of service level for the network context. In some aspects, the rate-based packet window is fixed in device firmware. In some aspects, a rate-based packet window is assigned to each network context or network context type.

Figure 4B:
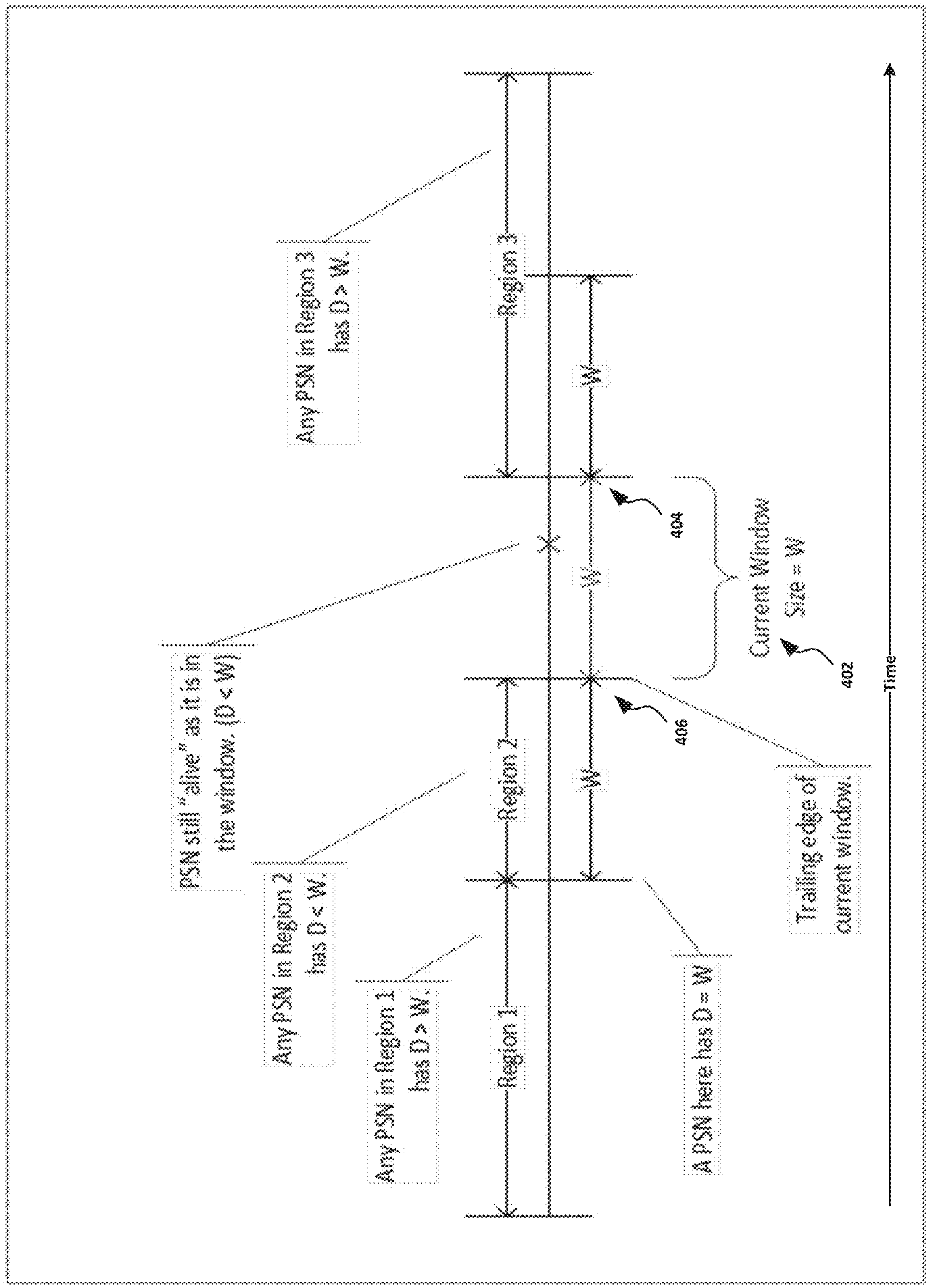
FIG. 4B schematically illustrates aspects of the operation of the system of FIG. 1 in accordance with some embodiments.

In some aspects, the electronic processor 205, for each of the plurality of data packets, is able to approximate a time to live (TTL) based on the packet sequence number for the data packet and the trailing edge of the rate-based packet window. While within the rate-based packet window, the TTL is relevant. For example, the electronic processor 205 may consider a packets TTL in conjunction with other QoS metrics when making decisions on transmission or retransmission of packets. However, the electronic processor 205 aborts, rather than transmits (or re-transmits), a data packet when its packet sequence number is outside of the rate-based packet window. FIG. 4B illustrates this concept. In FIG. 4B, the rate-based packet window 402 is illustrated, along with three regions in time (Region 1, Region 2, and Region 3). As described above with respect to FIG. 4A, the rate-based packet window 402 has a leading edge 404 and a trailing edge 406, defining the window size W. How the electronic processor 205 handles data packets depends on where the data packet's packet sequence number (PSN in FIG. 4B) falls with respect to the rate-based packet window 402 and Regions 1, 2, and 3. FIG. 4B illustrates several examples (where D is the distance (i.e., duration) between a PSN and the trailing edge 406 of the current packet window). Any data packet with a PSN in either Region 1 or Region 3 has a distance D to the trailing edge 406 of the rate-based packet window 402 greater than the window size W. However, Region 2 is the time period just after the current rate-based packet window 402 where a packet sequence number indicates that the data packet will be "dead" (see below) but still has a distance D of less than W. So merely using a duration measurement as the comparison to determine if a PSN is "alive" or "dead" is insufficient. The electronic processor 205 should abort the packet in Region 2 as well. Accordingly, the electronic processor 205 looks at the PSN for the data packet and, when it does not fall into the range of PSNs represented by the current rate-based packet window 402, it aborts the data packet. It should be noted that the valid range of PSNs can "wrap" around as the rate-based packet window 402 slides over the end of the stair-cased sawtooth waveform 408 (see FIG. 4A).

At block 308, the electronic processor 205 receives, via the transceiver 225, a second plurality of data packets. The packets are received, for example, from one or more of the first end node 112, the second end node 114, and the third end node 116. As illustrated in FIG. 4A, packets may be received inside and outside of the rate-based packet window 402. However, not all received packets are passed on to an application for further processing.

For example, the electronic processor 205 may receive "dead" packets. A dead packet is a packet that arrives after the rate-based packet window has moved past the packet sequence number for that packet. For each of the second plurality of data packets, the electronic processor 205 aborts the data packet (at block 312), rather than passing it to the application layer 301, when its packet sequence number is outside of the rate-based packet window (at block 310).

In some aspects, the electronic processor 205 passes data packets to the application layer 301 based on the packet sequence numbers. For example, the electronic processor 205 may determine a subset of the second plurality of data packets having a packet sequence number inside of the rate-based packet window (e.g., to avoid processing dead packets). For each of the subset of the second plurality of data packets, the electronic processor 205 may pass the data packet to an application based on its packet sequence number (e.g., ordering them sequentially).

In some aspects, data packets may be marked for sequential delivery, for example, using an ordered delivery bit. For example, the electronic processor 205 may, for each of the subset of the second plurality of data packets where the ordered delivery bit is set, pass the data packet to an application based on its packet sequence number (e.g., ordering them sequentially). However, the electronic processor 205 may, for each of the subset of the second plurality of data packets where the ordered delivery bit is not set, pass the data packet to an application upon receipt, regardless of its packet sequence number. In this way, packets not requiring ordered or sequential delivery may be processed more quickly.

In some aspects, the electronic processor 205 performs duplicate detection and rejection using packet sequence numbers. For example, the electronic processor 205, upon receipt of a data packet, may record the packet sequence number for the data packet (e.g., in the memory 210). When receiving a subsequent data packet, the electronic processor 205 compares the packet sequence number for that data packet to those stored in the memory 210, and rejects the data packet where there is match, because a match indicates that the data packet was already received. Using packet sequence numbers thusly provides for duplicate detection and rejection without the need for additional packet overhead. Memory usage is also limited because only packet sequence numbers within the current window need be stored, limiting the memory required to a fixed amount. In some aspects, duplicate detection is performed only after checking that the packet is not "dead," as described above, further reducing the processing required to implement duplicate detection and rejection.

By using the rate-based packet windowing techniques described herein, an example of which is performed using the method 300, certain packet delivery service qualities may be implemented without any additional over-the-air (OTA) signaling, by leveraging the TDMA synchronization constraint of the wireless network.

For example, because both the transmitter and the receiver are synchronized to UTC time by virtue of the TDMA network transmission constraints, both devices always know the absolute position of the rate-based packet window at any given time without additional signaling. Further, choosing a T that guarantees the termination of any packets outside of the rate-based packet window, only packets with a packet sequence number within W will be accepted by a receiving device. This provides a reasonable upper limit on device memory to track previously received packets by bounding the number of packet sequence numbers that must be stored to W*R. Therefore, the rate-based packet windowing techniques described herein provide a consistent duplicate detection and rejection solution.

Ordered data delivery is provided naturally through the use of the packet sequence numbers, as described herein.

Flow control is also provided. The transmitted packet sequence numbers are not necessarily contiguous, as the transmitter may transmit packets at a rate less than R. The transmitter may not, however, transmit faster than R as this would prevent the uniqueness of the packet sequence numbers. This upper bound on the transmission rate provides for a desired flow control without any signaling.

The rate-based packet windowing techniques described herein also provide a signaling benefit with respect to the segmentation and reassembly (SAR) of larger packets. For example, when a data packet arrives at the network interface and it is too large to fit within a given transmission slot within the TDMA structure, the data packet must be segmented at the transmitter and subsequently reassembled at the receiver. Reassembly requires each segment to be identified as 1) belonging to a given packet and 2) having a specific position within the packet relative to other segments. Packet sequence numbers can be used to provide the packet membership information and reduce the necessary SAR overhead.

In one example, the electronic processor 205, for one of the first plurality of data packets, segments the packet into a plurality of packet segments. Each of the plurality of packet segments has a packet membership identifier identical to the packet sequence number assigned to the data packet and a position identifier. The position identifier identifies the segments position in the packet relative to other segments.

Once segmented, the electronic processor 205 transmits, via the transceiver 225, the plurality of packet segments during the rate-based packet window based on the number of packet segments and the maximum packet transmission rate. Flow control limits the transmission rate of packets but not packet segments. For example, if a packet was large enough to require 10 transmitted segments, the transmitter could transmit at a rate of 10 segments per second while maintaining a maximum packet rate of 1 packet per second.

It should be noted that the rate-based packet windowing techniques described herein can be applied to different network contexts within the wireless network to allow for finer tuning of network performance. In some network contexts, all packets within the context are expected to receive a similar or same QoS treatment. In some aspects, the window size may be selected based on the maximum QoS budget. Anything outside the window size would fail, so a rate-based packet window set based on the maximum QoS budget wouldn't allow these failing packets to transmit in the first place. When the QoS budget matches the window size, there is no need for the QoS function to drop packets because they never make it to the receiving end. This increases network efficiency.

In some aspects, the electronic processor 205 determines the size of the rate-based packet window or the maximum packet transmission rate based on one or more of a packet delay, a signaling overhead efficiency, and a device memory usage.

Figure 5:
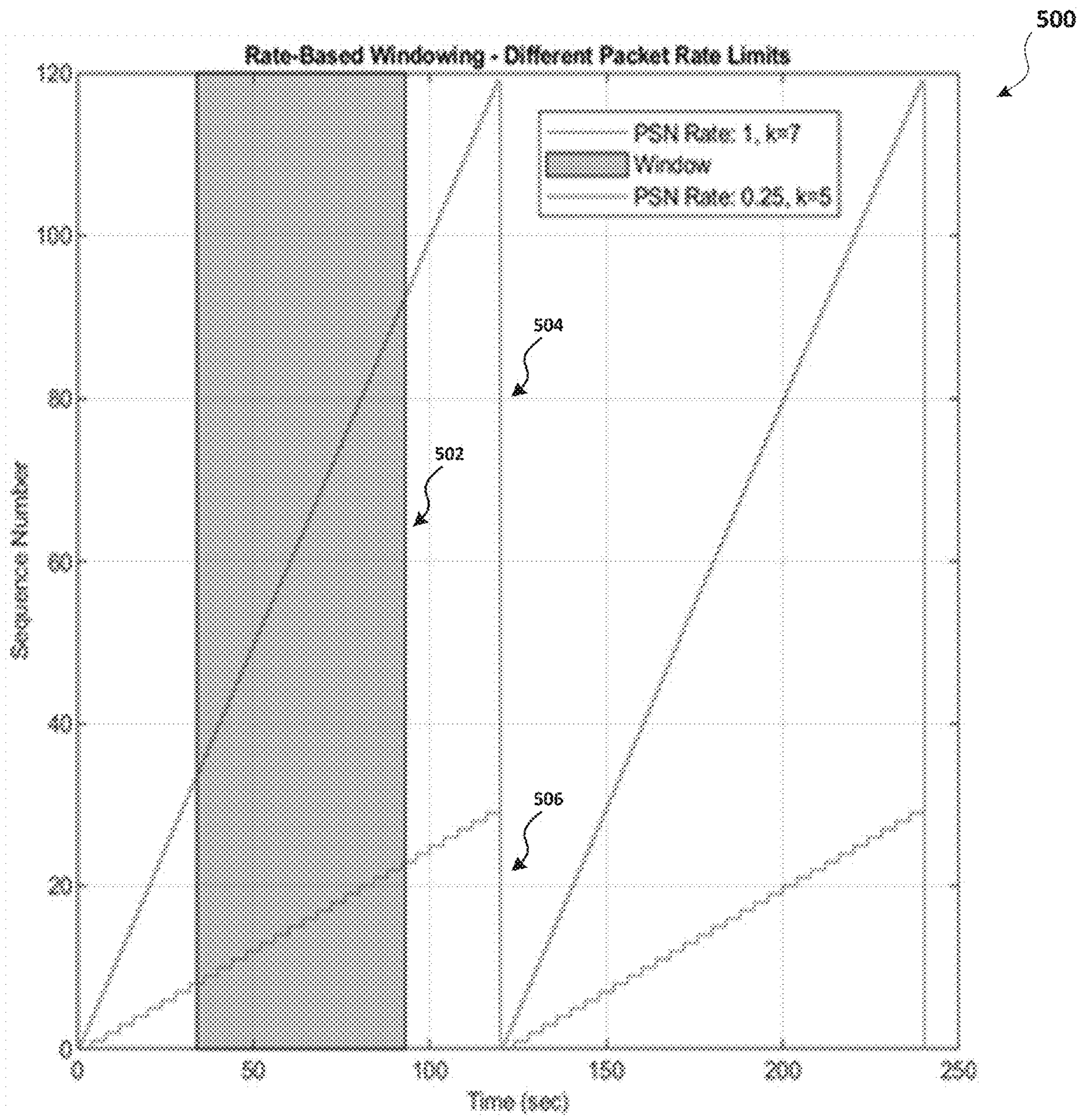
FIG. 5 is a chart illustrating aspects of the operation of the system of FIG. 1 in accordance with some embodiments.

For example, as illustrated in FIG. 5, the lowering of the maximum packet transmission rate, R, decreases the maximum traffic flow for that context and may shrink the overhead (in number of bits) needed to provide the packet sequence numbers. This, in turn, improves OTA efficiency. FIG. 5 includes a chart 500, which illustrates a rate-based packet window 502 and two possible maximum packet transmission rates 504 and 506. In addition, a lower maximum packet transmission rate can reduce a device's memory requirement as W*R will decrease as R decreases. This may be desirable for some contexts where the maximum traffic flow rate is known to be lower and, therefore, additional overhead for packet sequence number signaling is unnecessary. Conversely, the rate may be increased, if necessary, at the cost of signaling efficiency and memory usage.

Figure 6:
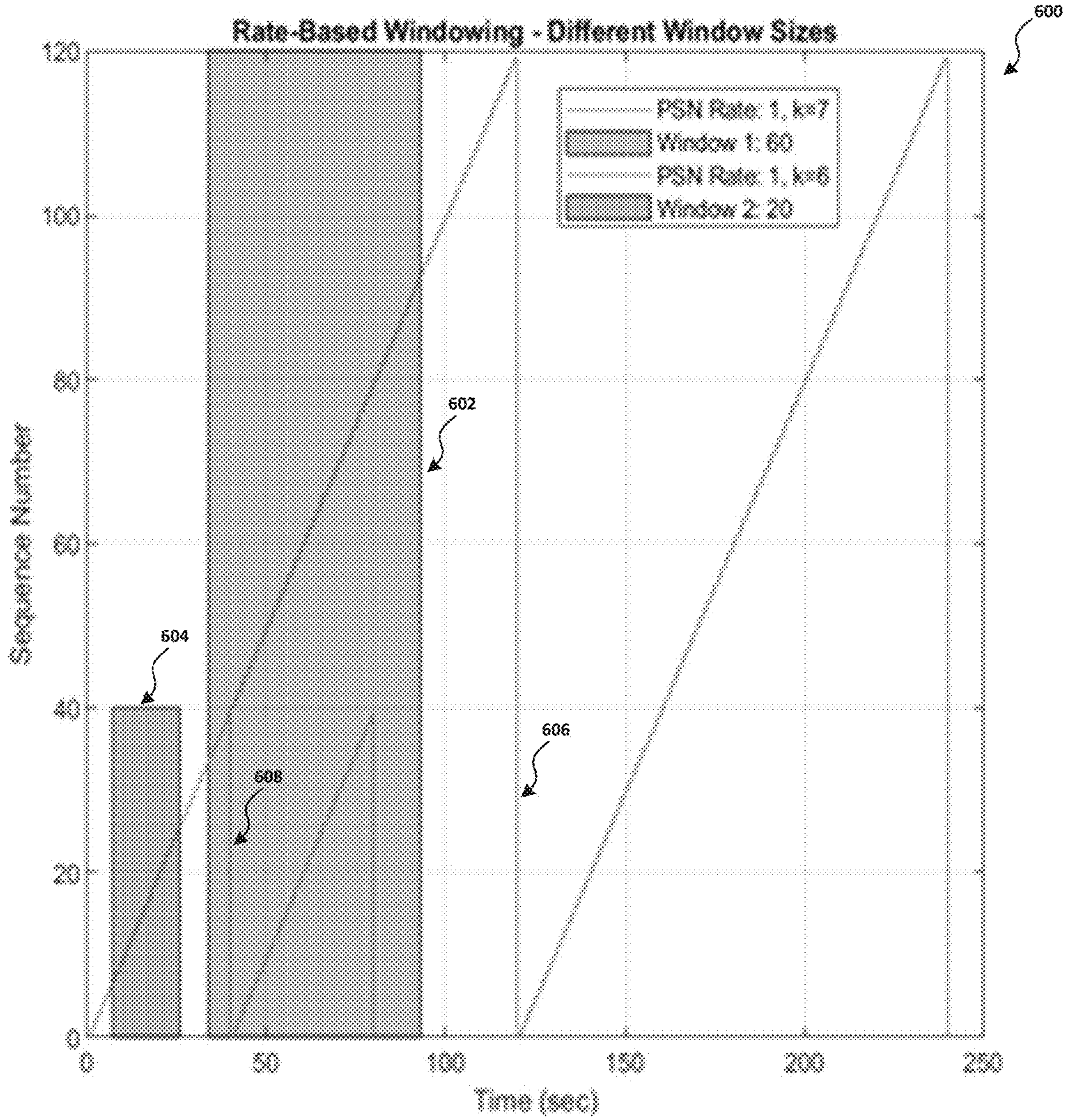
FIG. 6 is a chart illustrating aspects of the operation of the system of FIG. 1 in accordance with some embodiments.

As illustrated in FIG. 6, a lowering of window size W has a similar impact on OTA bit efficiency and memory usage. FIG. 6 includes a chart 600, which illustrates two possible rate-based packet windows 602 and 604, and two possible maximum packet transmission rates 606 and 608. A lower window size may be desirable if the maximum desired packet delay budget (PDB) for a given traffic flow is much smaller. This allows the network to expire traffic in this context faster by having a smaller TTL.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

In the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make any one or more than one of the multiple determinations.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The following paragraphs provide various examples of the embodiments disclosed herein.

Example 1. A wireless communication device comprising: an electronic processor; and a transceiver coupled to the electronic processor; wherein the electronic processor is configured to: assign each of a first plurality of data packets a packet sequence number based on a time synchronization for a data link layer for a network context; and transmit, via the transceiver, the first plurality of data packets for the network context during a rate-based packet window at or below a maximum packet transmission rate based on a time period and the rate-based packet window.

Example 2. The wireless communication device of example 1, wherein: the network context is one selected from a group consisting of a physical carrier, a bearer channel, and a pair of wireless communication devices.

Example 3. The wireless communication device of any of examples 1 and 2, wherein: a size of the time period is greater than the size of the rate-based packet window.

Example 4. The wireless communication device of any of examples 1-3, wherein the electronic processor is configured to: determine the rate-based packet window based on a desired quality of service level for the network context.

Example 5. The wireless communication device of any of examples 1-4, wherein the electronic processor is configured to: derive the packet sequence number for each of the first plurality of data packets based on a leading edge of the rate-based packet window.

Example 6. The wireless communication device of any of examples 1-5, wherein the electronic processor is configured to: receive, via the transceiver, a second plurality of data packets; and for each of the second plurality of data packets, abort the data packet when its packet sequence number is outside of the rate-based packet window.

Example 7. The wireless communication device of example 6, wherein: the second plurality of data packets are received based on a second rate-based packet window.

Example 8. The wireless communication device of any of examples 1-5, wherein the electronic processor is configured to: receive, via the transceiver, a second plurality of data packets; determine a subset of the second plurality of data packets having a packet sequence number inside of the rate-based packet window; and for each of the subset of the second plurality of data packets, pass the data packet to an application based on its packet sequence number.

Example 9. The wireless communication device of example 8, wherein: each of the subset of the second plurality of data packets has an ordered delivery bit; and the electronic processor is configured to: for each of the subset of the second plurality of data packets where the ordered delivery bit is set, pass the data packet to an application based on its packet sequence number; and for each of the subset of the second plurality of data packets where the ordered delivery bit is not set, pass the data packet to an application upon receipt, regardless of its packet sequence number.

Example 10. The wireless communication device of any of examples 1-9, wherein the electronic processor is configured to: receive, via the transceiver, a first data packet having a first packet sequence number; receive, via the transceiver, a second data packet having a second packet sequence number; abort the second data packet when the second packet sequence number matches the first sequence number;

and pass the data packet to an application when the second packet sequence number does not match the first sequence number.

Example 11. The wireless communication device of any of examples 1-10, wherein the electronic processor is configured to: for one of the first plurality of data packets, segment the packet into a plurality of packet segments, each of the plurality of packet segments having a packet membership identifier identical to the packet sequence number assigned to the one of the first plurality of data packet and a position identifier; and transmit, via the transceiver, the plurality of packet segments during the rate-based packet window based on the number of packet segments and the maximum packet transmission rate.

Example 12. The wireless communication device of any of examples 1-10, wherein the electronic processor is configured to: receive, via the transceiver, a plurality of packet segments during the rate-based packet window, each of the plurality of packet segments having a packet membership identifier and a position identifier; and for each of the plurality of packet segments having a matching packet membership identifier, assemble the packet segment into a data packet based on the position identifier of the packet segment, wherein the packet sequence number of the assembled data packet is identical to the matching packet membership identifier.

Example 13. The wireless communication device of any of examples 1-12, wherein the electronic processor is configured to: determine the maximum packet transmission rate based on at least one selected from the group consisting of a packet delay budget, a signaling overhead efficiency, and a device memory usage.

Example 14. The wireless communication device of any of examples 1-13, wherein the electronic processor is configured to: determine the size of the rate-based packet window based on at least one selected from the group consisting of a packet delay budget, a signaling overhead efficiency, and a device memory usage.

Example 15. The wireless communication device of any of examples 1-14, wherein the electronic processor is configured to: shift the rate-based packet window forward as time progresses based on the maximum packet transmission rate.

Example 16. A method for operating a wireless communication device, the method comprising: assigning a packet sequence number to each of a first plurality of data packets based on a time synchronization for a data link layer for a network context; and transmitting, via a transceiver, the first plurality of data packets for the network context during a rate-based packet window at or below a maximum packet transmission rate based on a time period and the rate-based packet window.

Example 17. The method of example 16, wherein: the network context is one selected from the group consisting of a physical carrier, a bearer channel, and a pair of wireless communication devices.

Example 18. The method of any of examples 16 and 17, wherein: a size of the time period is greater than the size of the rate-based packet window.

Example 19. The method of any of examples 16-18, further comprising: determining the rate-based packet window based on a desired quality of service level for the network context.

Example 20. The method of any of examples 16-19, further comprising: deriving the packet sequence number for each of the plurality of data packets based on a leading edge of the rate-based packet window.

Example 21. The method of any of examples 16-20, further comprising: receiving, via the transceiver, a second plurality of data packets; and for each of the second plurality of data packets, aborting the data packet when its packet sequence number is outside of the rate-based packet window.

Example 22. The method of example 21, wherein: the second plurality of data packets are received based on a second rate-based packet window.

Example 23. The method of any of examples 16-20, further comprising: receiving, via the transceiver, a second plurality of data packets; determining a subset of the second plurality of data packets having a packet sequence number inside of the rate-based packet window; and for each of the subset of the second plurality of data packets, passing the data packet to an application based on its packet sequence number.

Example 24. The method of example 23, wherein: each of the subset of the second plurality of data packets has an ordered delivery bit; and the method further comprises: for each of the subset of the second plurality of data packets where the ordered delivery bit is set, passing the data packet to the application based on its packet sequence number; and for each of the subset of the second plurality of data packets where the ordered delivery bit is not set, passing the data packet to the application upon receipt, regardless of its packet sequence number.

Example 25. The method of any of examples 16-24, further comprising: receiving, via the transceiver, a first data packet having a first packet sequence number; receiving, via the transceiver, a second data packet having a second packet sequence number; aborting the second data packet when the second packet sequence number matches the first sequence number; and passing the data packet to an application when the second packet sequence number does not match the first sequence number.

Example 26. The method of any of examples 16-25, further comprising: for one of the first plurality of data packets, segmenting the packet into a plurality of packet segments, each of the plurality of packet segments having a packet membership identifier identical to the packet sequence number assigned to the one of the first plurality of data packet and a position identifier; and transmitting, via the transceiver, the plurality of packet segments during the rate-based packet window based on the number of packet segments and the maximum packet transmission rate.

Example 27. The method of any of examples 16-25, further comprising: receiving, via the transceiver, a plurality of packet segments during the rate-based packet window, each of the plurality of packet segments having a packet membership identifier and a position identifier; and for each of the plurality of packet segments having a matching packet membership identifier, assembling the packet segment into a data packet based on the position identifier of the packet segment, wherein the packet sequence number of the assembled data packet is identical to the matching packet membership identifier.

Example 28. The method of any of examples 16-27, further comprising: determining the maximum packet transmission rate based on at least one selected from the group consisting of a packet delay budget, a signaling overhead efficiency, and a device memory usage.

Example 29. The method of any of examples 16-28, further comprising: determining the size of the rate-based packet window based on at least one selected from the group consisting of a packet delay budget, a signaling overhead efficiency, and a device memory usage.

Example 30. The method of any of examples 16-29, further comprising: shifting the rate-based packet window forward as time progresses based on the maximum packet transmission rate.

I claim:

1. A wireless communication device participating in a wireless network, the device comprising:

an electronic processor; and a transceiver coupled to the electronic processor;

wherein the electronic processor is configured to:

assign each of a first plurality of data packets a packet sequence number based on a time synchronization for a data link layer for a network context, wherein the time synchronization is an absolute time reference for the data link layer; and transmit, via the transceiver, the first plurality of data packets for the network context during a rate-based packet window at or below a maximum packet transmission rate based on a time period and the rate-based packet window, wherein the rate-based packet window is synchronized between the wireless communication device and a receiving end node of the wireless network based on the absolute time reference without additional signaling overhead to synchronize the rate-based packet window.

2. The wireless communication device of claim 1, wherein:

the network context is one selected from a group consisting of a physical carrier, a bearer channel, and a pair of wireless communication devices.

3. The wireless communication device of claim 1, wherein:

a size of the time period is greater than the size of the rate-based packet window.

4. The wireless communication device of claim 1, wherein the electronic processor is configured to:

determine the rate-based packet window based on a desired quality of service level for the network context.

5. The wireless communication device of claim 1, wherein the electronic processor is configured to:

derive the packet sequence number for each of the first plurality of data packets based on a leading edge of the rate-based packet window.

6. The wireless communication device of claim 1, wherein the electronic processor is configured to:

receive, via the transceiver, a second plurality of data packets; and for each of the second plurality of data packets, abort the data packet when its packet sequence number is outside of the rate-based packet window.

7. The wireless communication device of claim 6, wherein:

the second plurality of data packets are received based on a second rate-based packet window.

8. The wireless communication device of claim 1, wherein the electronic processor is configured to:

receive, via the transceiver, a second plurality of data packets;

determine a subset of the second plurality of data packets having a packet sequence number inside of the rate-based packet window; and for each of the subset of the second plurality of data packets, pass the data packet to an application based on its packet sequence number.

9. The wireless communication device of claim 8, wherein:

each of the subset of the second plurality of data packets has an ordered delivery bit; and the electronic processor is configured to:

for each of the subset of the second plurality of data packets where the ordered delivery bit is set, pass the data packet to an application based on its packet sequence number; and for each of the subset of the second plurality of data packets where the ordered delivery bit is not set, pass the data packet to an application upon receipt, regardless of its packet sequence number.

10. The wireless communication device of claim 1, wherein the electronic processor is configured to:

receive, via the transceiver, a first data packet having a first packet sequence number;

receive, via the transceiver, a second data packet having a second packet sequence number;

abort the second data packet when the second packet sequence number matches the first sequence number; and pass the data packet to an application when the second packet sequence number does not match the first sequence number.

11. The wireless communication device of claim 1, wherein the electronic processor is configured to:

for one of the first plurality of data packets, segment the packet into a plurality of packet segments, each of the plurality of packet segments having a packet membership identifier identical to the packet sequence number assigned to the one of the first plurality of data packet and a position identifier; and transmit, via the transceiver, the plurality of packet segments during the rate-based packet window based on the number of packet segments and the maximum packet transmission rate.

12. The wireless communication device of claim 1, wherein the electronic processor is configured to:

receive, via the transceiver, a plurality of packet segments during the rate-based packet window, each of the plurality of packet segments having a packet membership identifier and a position identifier; and for each of the plurality of packet segments having a matching packet membership identifier, assemble the packet segment into a data packet based on the position identifier of the packet segment, wherein the packet sequence number of the assembled data packet is identical to the matching packet membership identifier.

13. The wireless communication device of claim 1, wherein the electronic processor is configured to:

determine the maximum packet transmission rate based on at least one selected from the group consisting of a packet delay budget, a signaling overhead efficiency, and a device memory usage.

14. The wireless communication device of claim 1, wherein the electronic processor is configured to:

determine the size of the rate-based packet window based on at least one selected from the group consisting of a packet delay budget, a signaling overhead efficiency, and a device memory usage.

15. The wireless communication device of claim 1, wherein the electronic processor is configured to:

shift the rate-based packet window forward as time progresses based on the maximum packet transmission rate.

16. A method for operating a wireless communication device participating in a wireless network, the method comprising:

assigning a packet sequence number to each of a first plurality of data packets based on a time synchronization for a data link layer for a network context, wherein the time synchronization is an absolute time reference for the data link layer; and transmitting, via a transceiver, the first plurality of data packets for the network context during a rate-based packet window at or below a maximum packet transmission rate based on a time period and the rate-based packet window, wherein the rate-based packet window is synchronized between the wireless communication device and a receiving end node of the wireless network based on the absolute time reference without additional signaling overhead to synchronize the rate-based packet window.

17. The method of claim 16, wherein:

the network context is one selected from the group consisting of a physical carrier, a bearer channel, and a pair of wireless communication devices.

18. The method of claim 16, wherein:

a size of the time period is greater than the size of the rate-based packet window.

19. The method of claim 16, further comprising:

determining the rate-based packet window based on a desired quality of service level for the network context.

20. The method of claim 16, further comprising:

deriving the packet sequence number for each of the plurality of data packets based on a leading edge of the rate-based packet window.

21. The method of claim 16, further comprising:

receiving, via the transceiver, a second plurality of data packets; and for each of the second plurality of data packets, aborting the data packet when its packet sequence number is outside of the rate-based packet window.

22. The method of claim 21, wherein:

the second plurality of data packets are received based on a second rate-based packet window.

23. The method of claim 16, further comprising:

receiving, via the transceiver, a second plurality of data packets;

determining a subset of the second plurality of data packets having a packet sequence number inside of the rate-based packet window; and for each of the subset of the second plurality of data packets, passing the data packet to an application based on its packet sequence number.

24. The method of claim 23, wherein:

each of the subset of the second plurality of data packets has an ordered delivery bit; and the method further comprises:

for each of the subset of the second plurality of data packets where the ordered delivery bit is set, passing the data packet to the application based on its packet sequence number; and for each of the subset of the second plurality of data packets where the ordered delivery bit is not set, passing the data packet to the application upon receipt, regardless of its packet sequence number.

25. The method of claim 16, further comprising:

receiving, via the transceiver, a first data packet having a first packet sequence number;

receiving, via the transceiver, a second data packet having a second packet sequence number;

aborting the second data packet when the second packet sequence number matches the first sequence number; and passing the data packet to an application when the second packet sequence number does not match the first sequence number.

26. The method of claim 16, further comprising:

for one of the first plurality of data packets, segmenting the packet into a plurality of packet segments, each of the plurality of packet segments having a packet membership identifier identical to the packet sequence number assigned to the one of the first plurality of data packet and a position identifier; and transmitting, via the transceiver, the plurality of packet segments during the rate-based packet window based on the number of packet segments and the maximum packet transmission rate.

27. The method of claim 16, further comprising:

receiving, via the transceiver, a plurality of packet segments during the rate-based packet window, each of the plurality of packet segments having a packet membership identifier and a position identifier; and for each of the plurality of packet segments having a matching packet membership identifier, assembling the packet segment into a data packet based on the position identifier of the packet segment, wherein the packet sequence number of the assembled data packet is identical to the matching packet membership identifier.

28. The method of claim 16, further comprising:

determining the maximum packet transmission rate based on at least one selected from the group consisting of a packet delay budget, a signaling overhead efficiency, and a device memory usage.

29. The method of claim 16, further comprising:

determining the size of the rate-based packet window based on at least one selected from the group consisting of a packet delay budget, a signaling overhead efficiency, and a device memory usage.

30. The method of claim 16, further comprising:

shifting the rate-based packet window forward as time progresses based on the maximum packet transmission rate.

* * * * *